(12) United States Patent
Chiussi et al.

(10) Patent No.: US 6,618,391 B1
(45) Date of Patent: Sep. 9, 2003

(54) METHOD AND APPARATUS FOR GUARANTEEING DATA TRANSFER RATES AND DELAYS IN DATA PACKET NETWORKS USING DISCRETE DATA TRANSFER RATES

(75) Inventors: Fabio Massimo Chiussi, Tinton Falls, NJ (US); Andrea Francini, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/247,742

(22) Filed: Feb. 9, 1999

Related U.S. Application Data

(60) Provisional application No. 60/079,721, filed on Mar. 27, 1998.

(51) Int. Cl.[7] ................................................ H04L 12/28
(52) U.S. Cl. ....................... 370/418; 370/429; 370/235
(58) Field of Search .................................. 370/229, 230, 370/235, 391, 412, 413, 414, 415, 416, 417, 418, 419, 429, 468, 395.4, 516, 252, 428

(56) References Cited

U.S. PATENT DOCUMENTS

| | | | | |
|---|---|---|---|---|
| 6,038,217 A | * | 3/2000 | Lyles | 370/233 |
| 6,072,772 A | * | 6/2000 | Charny et al. | 370/229 |
| 6,101,193 A | * | 8/2000 | Ohba | 370/429 |
| 6,134,217 A | * | 10/2000 | Stiliadis et al. | 370/232 |
| 6,215,791 B1 | * | 4/2001 | Kim | 370/412 |
| 6,408,005 B1 | * | 6/2002 | Fan et al. | 370/412 |

* cited by examiner

Primary Examiner—Dang Ton
Assistant Examiner—Phuc Tran

(57) ABSTRACT

A scheduler and method for use in ATM and packet communication systems applies a no-per-connection-timestamp discrete-rate scheduling technique which does not require the computation and storage of one timestamp per connection, and only maintains a single timestamp per supported service rate. The elimination of the per-connection timestamps has no negative effect on the delay bounds guaranteed by the scheduler. The total implementation cost of such schedulers which approximate the Generalized Processor Sharing (GPS) policy is reduced, since there is less complexity involved in maintaining and sorting the timestamps for all connections.

32 Claims, 5 Drawing Sheets

METHOD AND APPARATUS FOR GUARANTEEING DATA TRANSFER RATES AND DELAYS IN DATA PACKET NETWORKS USING DISCRETE DATA TRANSFER RATES

CROSS-REFERENCE TO RELATED APPLICATIONS

This application is related to co-pending U.S. patent application Ser. No. 60/079,721, filed Mar. 27,1998, and entitled METHOD AND APPARATUS FOR GUARANTEEING DATA TRANSFER RATES AND DELAYS IN DATA PACKET NETWORKS USING DISCRETE DATA TRANSFER RATES.

This application is also related to a commonly assigned and co-pending U.S. patent application of Fabio Chiussi and Andrea Francini, entitled METHOD AND APPARATUS FOR GUARANTEEING DATA TRANSFER RATES AND DELAYS IN DATA PACKET NETWORKS USING GENERALIZED DISCRETE DATA TRANSFER RATE APPROACH, filed Feb. 9, 1999.

BACKGROUND OF THE INVENTION

The present invention relates to packet communication systems, and in particular to a method and an apparatus for scheduling packets in packet networks for guaranteeing data transfer rates to data sources and data transfer delays from data sources to destinations using a plurality of queues, each of the queues serving data connections with the same guaranteed data transfer rate, and only computing and sorting a single timestamp for each of the queues. This invention can be used in any system for data packet forwarding such as Asynchronous Transfer Mode (ATM) switches and Internet Protocol (IP) routers.

Per-Virtual-Connection (Per-VC) schedulers are known which aim to approximate a Generalized Processor Sharing policy, as described in A. K. Parekh and R. G. Gallager, "A Generalized Processor Sharing Approach to Flow Control in Integrated Services Networks: The Single-Node Case", IEEE/ACM TRANSACTIONS ON NETWORKING, June 1993, pp. 344–357, which is incorporated herein by reference. As defined herein, the term "VC" is used throughout to mean "virtual connection". It is understood that virtual connections may also include virtual circuits and Internet Protocol (IP) flows. Implementation of such Per-VC schedulers is a central issue in next-generation switching systems. In a market arena in which cost targets are precipitously dropping, an important objective is to minimize the complexity involved in Per-VC schedulers, and to minimize the cost differential with respect to switches using less sophisticated scheduling.

As defined herein and throughout, the term "GPS" is an abbreviation for the Generalized Processor Sharing policy, as described in A. K. Parekh et al., supra. GPS-related packet-scheduling disciplines are based on maintaining a global function, referred to by different authors either as a virtual time, such as in A. K. Parekh et al, supra, and in S. J. Golestani, "A Self-Clocked Fair Queuing Scheme for Broadband Applications", PROCEEDINGS OF INFOCOM '94, April 1994, pp. 636–646, which is incorporated herein by reference; or as a system potential, such as described in D. Stiliadis and A. Varma, "Design and Analysis of Frame-based Fair Queuing: A New Traffic Scheduling Algorithm for Packet-Switched Networks", PROCEEDINGS OF SIGMETRICS '96, May 1996, pp. 104–115; and D. Stiliadis and A. Varma, "Efficient Fair Queuing Algorithms for ATM and Packet Networks", TECHNICAL REPORT UCSC-CRL-95-59, December 1995, with each of these references being incorporated herein by reference.

The global function tracks the amount of work that is done by the server to process packets in the communication system. The server uses this global function to compute, for each packet in the system, a timestamp that specifies when the packet should be transmitted relative to other packets. Packets are transmitted by increasing order of their timestamps. The specific function used as system potential determines the delay and fairness properties of each algorithm in the class.

The total implementation cost of these GPS-related scheduling algorithms is the combination of three factors: (i) the complexity of the function used as system potential to compute the timestamps for the packets in the system, (ii) the complexity involved in sorting the timestamps in order to select the packet with a minimum timestamp for transmission, and (iii) the cost of handling and storing the timestamps. In recent years, several scheduling algorithms which use a system-potential function of order $O(1)$ complexity have been introduced. Examples of such algorithms include Self-Clocked Fair Queuing (SCFQ), as described in S. J. Golestani, supra; Frame-based Fair Queuing (FFQ), as described in D. Stiliadis et al., "Design and Analysis of Frame-based Fair Queuing . . . ", supra; Virtual Clock, as described in L. Zhang, "Virtual Clock: A New Traffic Control Algorithm for Packet Switching", ACM TRANSACTIONS ON COMPUTER SYSTEMS, May 1991, pp. 101–124; and Minimum-Delay Self-Clocked Fair Queuing (MD-SCFQ), described in F. M. Chiussi and A. Francini, "Minimum-Delay Self-Clocked Fair Queuing Algorithm for Packet-Switched Networks", PROCEEDINGS OF INFOCOM '98, March 1998, each of which is incorporated herein by reference.

In particular, among these algorithms, MD-SCFQ has both optimal delay properties and excellent fairness properties. Scheduling algorithms achieving a desired performance with a system-potential function of minimal complexity are therefore available, but the total performance cost of the scheduler is still dominated by the complexity of sorting and storing the timestamps.

One well-known simplification in timestamp processing by a scheduler is obtained by assigning increasing values of timestamps to consecutive packets which belong to the same session, so that for each session only the timestamp of the packet at the head of the corresponding packet queue is to be considered and processed in the packet selection process. Such a timestamp is referred to as session timestamp. The number of session timestamps which have to be sorted is therefore equal to the number of sessions V supported by the scheduler. For example, typical values of V in current ATM switches, in which sessions are referred to as VCs, are in the order of tens of thousands of sessions. The range of possible values that the timestamps can assume at any given time depends on the ratio between the maximum and minimum service rates that the scheduler is required to provide to the connections. Such a timestamp range is typically very wide.

In view of the complexity in sorting a large number of timestamps over a wide range of possible values at the high speeds employed in broadband digital networks, hardware implementations of packet-switching systems are only affordable by data structures and processor configurations that are specifically devised to be efficiently mapped into silicon on integrated circuits or chips. Even with such specialized structures, the implementation cost may still be too high, and techniques to further reduce complexity are necessary. Different approaches are possible for this purpose. In some cases, the specific properties of a scheduler can help in simplifying the selection process.

Several techniques have been proposed to reduce the cost of the sorting operation. In particular, two approaches are the Logarithmic Calendar Queue (LCQ) introduced in F. M. Chiussi, A. Francini and J. G. Kneuer, "Implementing Fair Queuing in ATM Switches—Part 2: The Logarithmic Calendar Queue", PROCEEDINGS OF GLOBECOM '97, November 1997, pp. 519–525; as well as the discrete-rate scheduler presented in J. C. R. Bennett, D. C. Stephens and H. Zhang, "High Speed, Scalable, and Accurate Implementation of Fair Queuing Algorithms in ATM Networks", PROCEEDINGS OF ICNP '97, October 1997, pp. 7–14, each of which are incorporated herein by reference. Both of these approaches are arguably the two approaches that achieve the highest reduction in the hardware complexity of a GPS-related scheduler with optimal delay properties. In addition, such approaches introduce only a very small degradation in the delay bounds of the scheduler.

The LCQ is an optimized calendar queue which reduces the complexity by increasing, in an optimal manner, the granularity of the bins used to sort the timestamps, so that the relative degradation in delay bounds for each connection is equalized.

The discrete-rate scheduler is a relatively simple structure that can be used when the guaranteed service rates that the scheduler needs to support at any given time only belong to a relatively small set of discrete values. Such operating conditions are certainly realistic in most, if not all, ATM switches. As shown in FIG. 1, the illustrated discrete-rate scheduler 10 is a per-connection-timestamp scheduler having a corresponding timestamp for each of the sessions; for example, the sessions 14–16 in FIG. 1. Each of the sessions 14–16 has a corresponding timestamp 20–26, respectively.

Other advantages are known for using a discrete set of rates. In this case, connections with the same service rate are grouped together in common rate First-In-First-Out (FIFO) queues, and scheduling is performed only among the connections at the head of each rate FIFO queue. Accordingly, the per-connection timestamp scheduler 10 in FIG. 1 has the plurality of registers for storing pointers as heads 12 and tails 18 for maintaining the number N of rate FIFO queues 28, with the sessions 14–16 in a given queue having the same rate from among rates $r_1 \ldots r_N$. Thus, the registers 12 and 18 in Rate FIFO Queue 1 are associated with a common rate $r_1$, with a first head 12 labeled HEAD(1) as a head pointer pointing to a session in the queue and having an associated timestamp 20 labeled $F_{HEAD(1)}$; a first set of sessions 14–16 labeled $VC_{1,A}$ and $VC_{1,B}$, respectively, and having associated timestamps 22, 24 labeled $F_{1,A}$ and $F_{1,B}$, respectively; and a first tail TAIL(1) 18 as a tail pointer to a session in the queue and having an associated timestamp 26 labeled $F_{TAIL(1)}$. As described above, scheduling is performed by processing the sessions pointed to at the heads of the queues, with such sessions being processed by a smallest-eligible-virtual-finishing-time-first (SEFF) selector 30 to determine a minimum eligible timestamp for service from among the sessions pointed to by the heads of the queues 28.

The implemented scheduler may have certain properties for the maximum distance between timestamps of different connections having the same rate, and for the relation between system potential and timestamps, as is the case for the worst-case-fair weighted fair queuing system ($WF^2Q$, or alternatively $WF^2Q+$) described in J. C. R. Bennett and H. Zhang, "Hierarchical Packet Fair Queuing Algorithms", PROCEEDINGS OF SIGCOMM '96, August 1996, pp. 143–156; and other worst-case-fair schedulers, such as described in D. Stiliadis and A. Varma, "A General Methodology for Designing Efficient Traffic Scheduling and Shaping Algorithms", PROCEEDINGS OF INFOCOM '97, April 1997, with each of these articles being incorporated herein by reference.

By grouping together connections with the same service rate in common rate FIFO queues, the number of timestamps to be sorted is greatly reduced, for example, to be equal to the number of supported rates, and therefore the complexity of the sorting task is considerably decreased.

Although being important improvements in reducing the implementation complexity of GPS-related schedulers with near-optimal delay bounds, known approaches still require computing and storing a timestamp for each connection. The LCQ and other techniques presented in J. L. Rexford, A.G. Greenberg and F. G. Bonomi, "Hardware-Efficient Fair Queuing Architectures for High-Speed networks", PROCEEDINGS OF INFOCOM '96, March 1996, pp. 638–646, which is incorporated herein by reference; do not require per-connection timestamps when used to implement SCFQ, but this scheduling algorithm does not achieve near-optimal delay bounds.

However, because of the need of per-connection timestamps, the overhead in memory resources due to the scheduler remains significant. This is especially true in ATM, in which the size of the packet is relatively small, and the number of connections supported by the system is on the order of several thousands of connections. The number of connections is often of the same order of magnitude as the number of packets in a buffer, and that number is constantly increasing as the industry evolves to implement improved data packet networks.

SUMMARY OF THE INVENTION

It is recognized herein that it is possible to introduce approximations in the scheduling algorithms in order to simplify their implementation. In general, these approximations may negatively affect the delay and/or fairness properties of the scheduler, and the challenge is to optimize the design so that the degradations induced by the approximations are minimized.

It is an object of the present invention to provide a technique to further reduce the implementation cost of GPS-related schedulers with near-optimal delay bounds, using a No-Per-Connection Timestamp Discrete-Rate Scheduler. This scheduler does not require the computation and storage of a timestamp per connection, and only maintains a single timestamp per rate. The scheduler has a very simple two-level hierarchical structure, in which, at the lower level of the hierarchy, FIFO queues of connections are used with one FIFO queue per rate and with connections being queued without a timestamp. In the scheduler, a timestamp is only assigned to each rate FIFO queue, taking into account the aggregate bandwidth of all connections with that rate.

At the higher level of the hierarchy, the scheduler uses a worst-case-fair scheduler which schedules among the different FIFO queues. Any packet-by-packet rate-proportional server (P-RPS) as well as MD-SCFQ with a shaping mechanism can be used as a second-level scheduler. Such schedulers have been shown to constitute worst-case-fair schedulers. The shaping mechanism is obtained by adopting the SEFF packet-selection policy, which considers for service only packets whose transmission has already started in the underlying fluid system. If the worst-case-fair scheduler used is work-conserving, the resulting discrete-rate scheduler is also work-conserving.

The no-per-connection-timestamp scheduler has the same near-optimal delay properties of existing discrete-rate schedulers. The only disadvantage in the elimination of the timestamps per connection is some degradation in the fairness properties.

DETAILED DESCRIPTION OF THE PREFERRED EMBODIMENT

Figure 2:
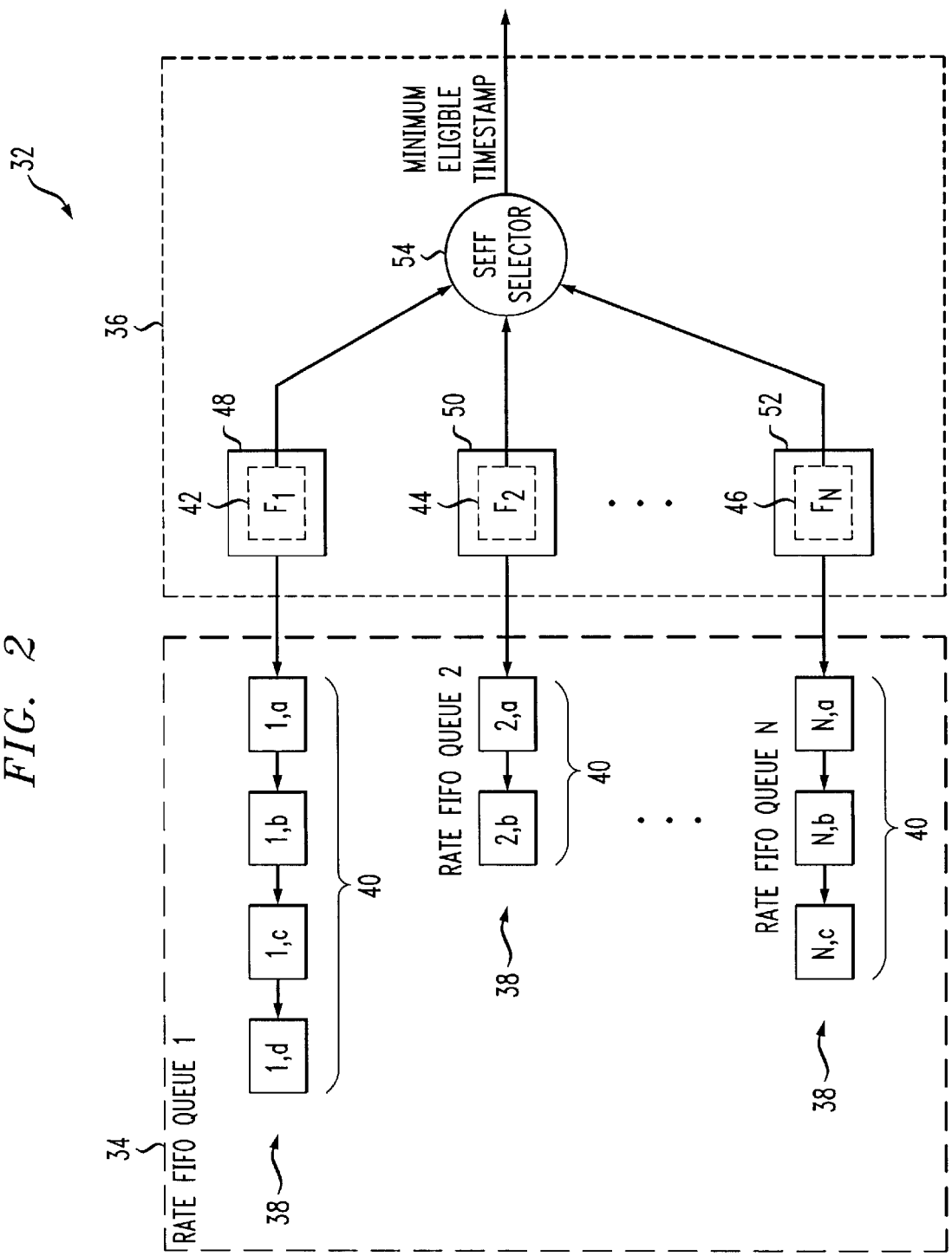
FIG. 2 illustrates the no-per-connection-timestamp scheduler with a hierarchical configuration.

Referring now to FIG. 2, the present invention relates to a method and apparatus implementing a technique for reducing the implementation complexity of a GPS-related scheduler with near-optimal delay bounds. It is to be understood that, although preferred embodiments are illustratively shown and described herein to reduce the implementation complexity for a GPS-related scheduler in an ATM network, the present invention can be applied to reduce the implementation complexity for any GPS-related scheduler in any packet network.

The apparatus shown in FIG. 2 implements a No-Per-Connection-Timestamp Discrete-Rate Scheduler 32 and method of use which removes the need and associated cost of maintaining per-connection timestamps in the implementation of GPS-related schedulers with near-optimal delay bounds, at the nominal cost of increasing the unfairness of the scheduler in the distribution of leftover bandwidth to connections that are simultaneously backlogged.

As illustrated in FIG. 2, the scheduler 32 has a two-level hierarchical configuration with a lower level 34 and a higher level 36. At the lower level 34 of the hierarchy, FIFO queues 38 are used to perform the lower-level scheduling of sessions, with one FIFO queue per rate and with connections and/or sessions 40 being queued without a timestamp. FIFO is the preferred method of queuing for optimal performance, but it is to be understood that other queuing methods may also be used, such as last-in-first-out (LIFO), which may have different performance characteristics.

In the preferred embodiment, sessions 40 having a first rate r, labeled (1,a 1,b 1,c 1,d) are queued in the first queue corresponding to the rate FIFO queue 1, while sessions 40 having a second rate $r_2$ and labeled (2,a 2,b) are queued in the second queue corresponding to the rate FIFO queue 2, and sessions 40 having an $NT^{th}$ rate $r_N$ and labeled (N,a N,b N,c) are queued in the $N^{TH}$ queue corresponding to the rate FIFO queue N.

In the scheduler 32, a timestamp is only assigned to each rate FIFO queue, taking into account the aggregate bandwidth of all connections with that rate. Such timestamps 42–46, labeled $F_1, F_2 \ldots F_N$ for the first, second, and $N^{TH}$ rate, respectively, are maintained in the higher level 36. The timestamps 42–46 may be associated with the heads 48–52, respectively, of each of the corresponding rate FIFO queues 38.

At the higher level 36 of the hierarchy, the scheduler 32 uses a worst-case-fair scheduler which schedules the selection of sessions for service from among the different FIFO queues. Any packet-by-packet rate-proportional server (P-RPS) as well as MD-SCFQ with a shaping mechanism can be used as the higher-level scheduler, since such servers have been shown to constitute worst-case-fair schedulers. The shaping mechanism is implemented in the scheduler 32 using an SEFF selector 54 to adopt a SEFF packet-selection policy from among the associated queues 38 and respective timestamps 48–52.

Figure 1:
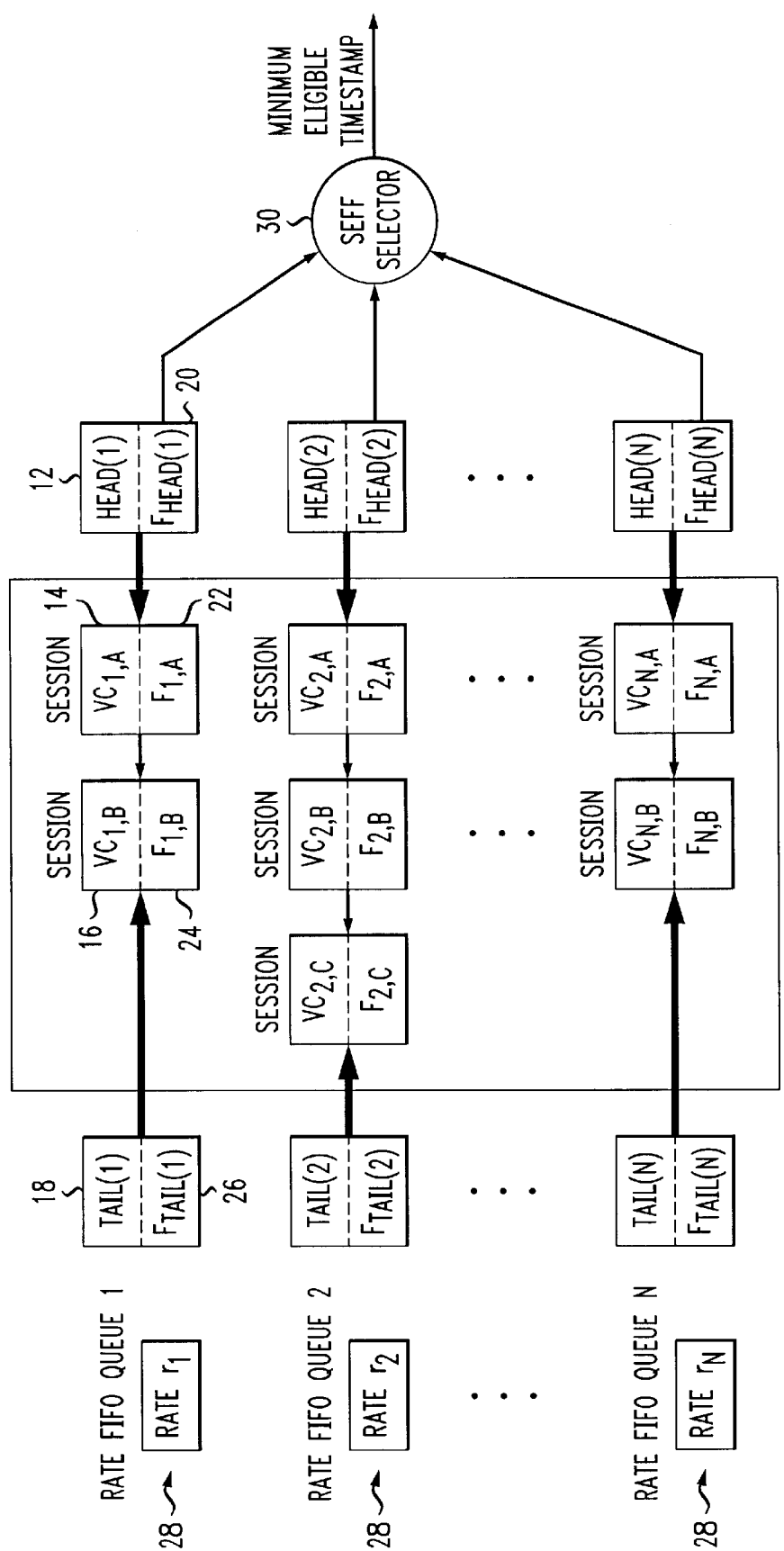
FIG. 1 illustrates a prior-art per-connection-timestamp scheduler.

The no-per-connection-timestamp scheduler 32 has the same near-optimal delay properties of existing discrete-rate schedulers, such as the scheduler 10 shown in FIG. 1. To be precise, the no-per-connection-timestamp scheduler 32 has better performance with regard to delay.

The server of the scheduler 32 simultaneously supports a fixed number N of guaranteed service rates at any given time, and a rate FIFO queue of sessions is associated with each rate. Unlike existing schedulers, the scheduler 32 shown in FIG. 2 processes sessions which do not have corresponding timestamps for each session, but instead the sessions have a single commonly associated timestamp maintained for each rate FIFO queue 38.

Within each of the FIFO queues 38, sessions 40 are handled as follows: when a FIFO queue is granted a service, the session currently at its head is dequeued and, if still backlogged, queued back to the tail of the corresponding rate FIFO queue. Newly backlogged sessions are queued at the tail of the respective FIFO queues.

Figure 3:
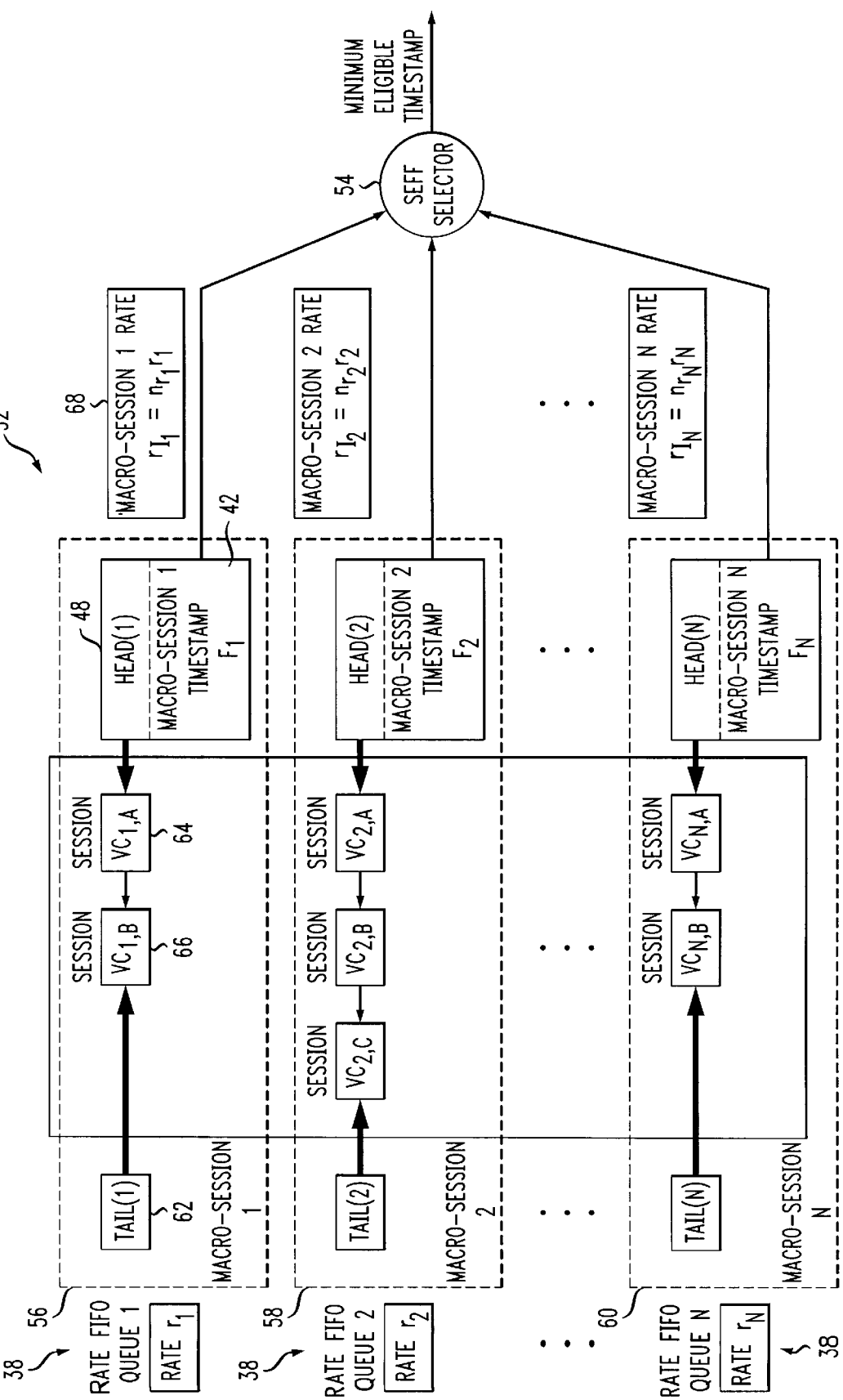
FIG. 3 illustrates the no-per-connection-timestamp scheduler of FIG. 2 in greater detail.

As shown in greater detail in FIG. 3, in the scheduler 32, each of the rate FIFO queues 38 is treated as a single macro-session by the scheduler 32, such that the queues 38 form a set of macro-sessions 56–60. Accordingly, for a given rate FIFO queue such as the queue having the timestamp 42 and the head 48, the macro-session 56 has the head 48 and tail 62 and includes the sessions 64–66 in the queue, with the timestamp 42 being associated with the entire queue and the entire macro-session 56.

For each $i^{TH}$ rate FIFO queue, the rate $r_1$, allocated to macro-session I is $r_{1_i} = n_{r_i} r_i$, with $n_{r_i}$ being the number of allocated sessions with service rate $r_i$, and, for macro-session I, each individual session has a service rate $r_i$. For example, the rate 68 labeled $r_{1_1}$, is $r_{1_1} = n_{r_1} r_1$ which is the rate allocated to macro-session 56 labeled $I_1$ for rate FIFO queue 1.

Macro-session I is idle when all of the allocated sessions with service rate $r_i$ are idle, and is backlogged when at least one of those allocated sessions is backlogged. At timeslot $h_l^k$, as the sessions are processed, after a previous session has been removed from its queue and serviced by the selector 54, a new session reaches the head of the queue of macro-session I and the new timestamp of the macro-session I is determined to be:

$$F_I^k = \max(F_I^{k-1}, P(h_I^k)) + \frac{1}{r_I} \quad (1)$$

in which the global function P( ) is the system potential or virtual time. Only one session is serviced at a time by the selector 54, and then the selection process starts over.

The two-level hierarchical configuration of the scheduler 32 is useful for studying the properties of the scheduler 32. For example, the scheduler 32 distributes service in the lower level 34 to the backlogged sessions of a given service rate in a round-robin fashion. In addition, the root node at which the SEFF selector 54 operates is a GPS-related scheduler that regulates the access of the macro-sessions to the outgoing link determined by the minimum eligible timestamp. The system potential of the root server is maintained according to the evolution of the state of the N macro-sessions.

In order to achieve near-optimal delay bounds, the scheduler 32 uses a P-RPS or MD-SCFQ scheduler with the SEFF packet-selection policy in a SEFF selector 54 as the root node. At timeslot m, the scheduler 32 selects for the next service the connection j which is at the head of the rate queue J whose timestamp $F_J$ is currently the minimum among the ones that satisfy the eligibility condition associated with the SEFF packet-selection policy:

$$F_J = \min_{1 \le l \le N} F_l \qquad (2)$$

such that $$F_l - \frac{1}{r_1} \le P(m) \qquad (3)$$

Using a P-RPS or MD-SCFQ scheduler with SEFF packet-selection policy at the root node 54, the following delay bounds hold for the no-per-connection-timestamp scheduler 32:

$$D_i \le \frac{b_i + 1}{r_i} + \frac{1}{4r_i} \qquad (4)$$

in which $b_i$ is a bucket size in a $(b_i, r_i)$-leaky-bucket-constrained session i. These delay bounds are very close to the optimal bounds for GPS-related schedulers in general. The delay bounds of the no-per-connection-timestamp scheduler 32 are better than the bounds of the discrete-rate scheduler 10 with per-connection timestamps.

Figure 4A:
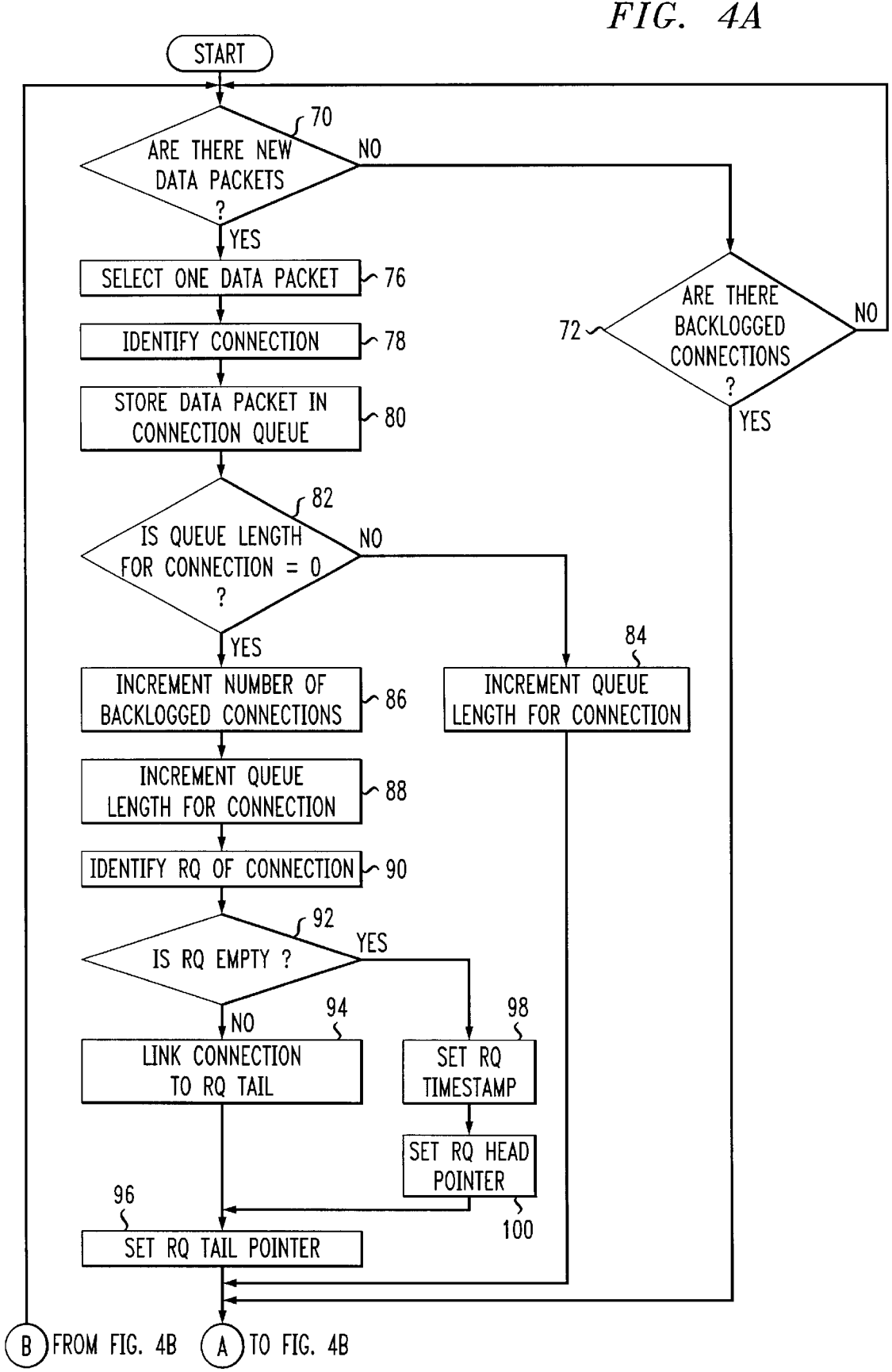
FIGS. 4A–4B illustrate a flowchart of operation of the no-per-connection-timestamp scheduler.
Figure 4B:
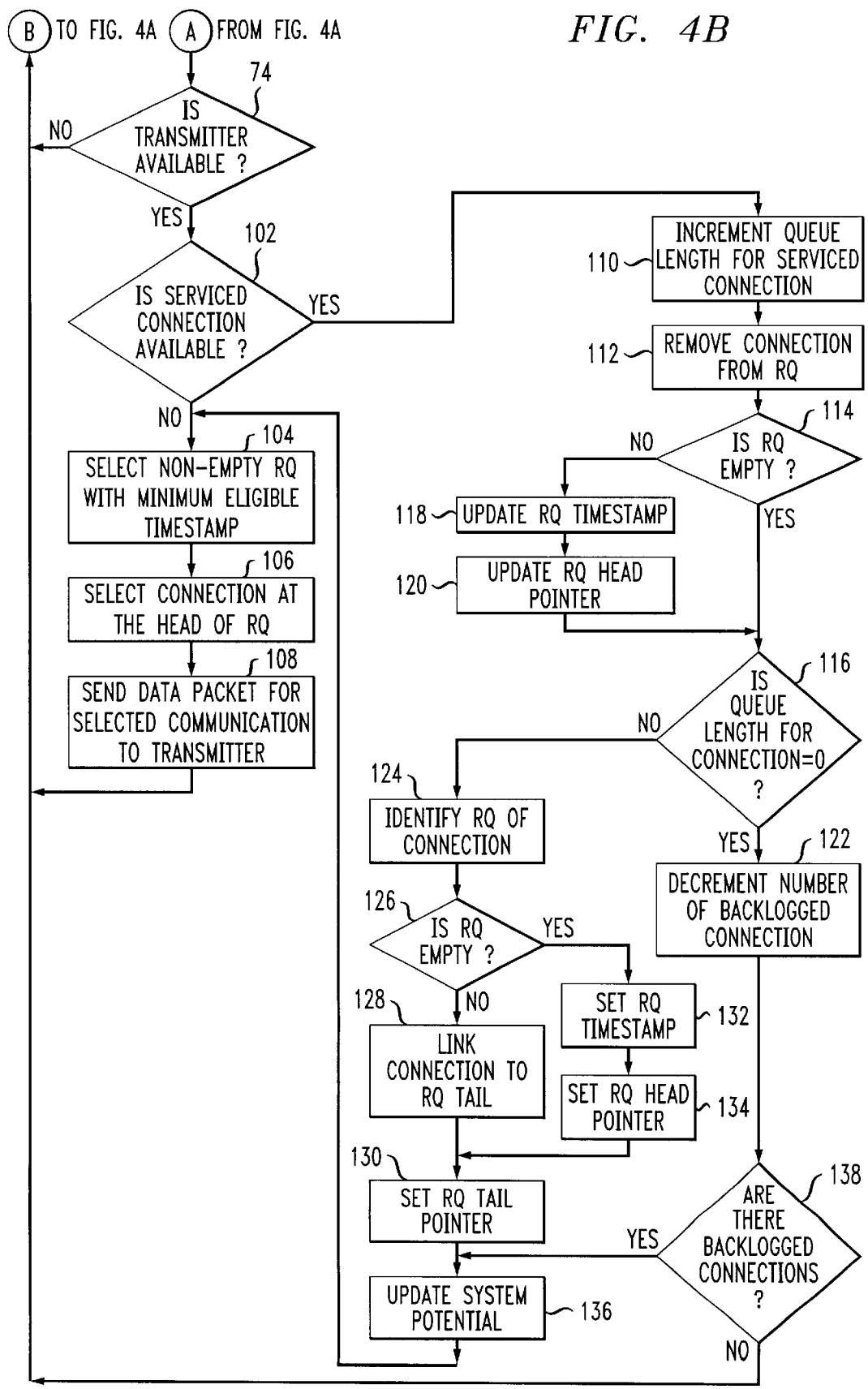

Referring to FIGS. 4A–4B, the method of operation of the scheduler 32 is illustrated in the flowchart as performing the step of initially determining if there are any new packets to process in step 70. If there are no new data packets, the method performs step 72; otherwise, the method performs step 74. In step 72, the method determines if there are any backlogged connections. If not, the method loops back to perform step 70; otherwise, if there are any backlogged connections in step 72, the method performs step 74, as described below.

Referring again to step 70, if there are new data packets detected in step 70 for processing, the method selects one data packet in step 76, identifies a connection for the data packet in step 78, and stores the data packet in step 80 in a packet queue associated with the identified connection. The method then determines in step 82 if the queue length for the identified connection is equal to zero. If not, the method increments the queue length for the connection in step 84, and proceeds to step 74, as described below. Otherwise, if the queue length for the connection is not equal to zero in step 82, the method increments the number of backlogged connections in step 86, increments the queue length for the connection in step 88, and identifies an appropriate rate queue (RQ) for the connection in step 90.

The method then determines in step 92 if the rate queue for the connection is empty. If not, the method links the connection to the tail of the rate queue in step 94, and sets the tail pointer of the rate queue in step 96 to queue the connection into the appropriate rate queue. For example, referring to FIG. 3, as the session 66 is entered into the rate FIFO queue 1 of the macro-session 56 labeled as macro-session 1, the session 66 is linked to the tail 62, and the tail 62 is set to point to the session 66.

Referring again to FIG. 4A, in step 92, if the rate queue appropriate to the connection is empty, the method sets the rate queue timestamp in step 98, sets the rate queue head pointer in step 100, and proceeds to step 96 to set the rate queue tail pointer. For example, referring to FIG. 3, prior to entry of the session 66, when the session 64 is initially to be entered into the macro-session 56 in which the macro-session 56 is initially empty, the rate queue timestamp 42 is set in step 98, the rate queue head pointer 48 is set to point to the session 64, and the rate queue tail pointer 62 is set to point to the session 64.

After steps 72, 84, or 96 in FIG. 4A, the method proceeds in FIG. 4B to step 74 to determine if a transmitter is available. If not, the method loops back to step 70 to continue receiving new packets. Otherwise, if a transmitter is available for transmitting a packet, the method performs step 102 to determine if a serviced connection is available. If a serviced connection is not available in step 102, the method selects a non-empty rate queue with the minimum eligible timestamp in step 104 for service by the SEFF selector 54. The method then selects the connection at the head of the rate queue with the minimum eligible timestamp in step 106, and sends a data packet from the packet queue associated with the selected connection to the transmitter in step 108. The method then loops back to process new data packets in step 70.

Referring back to step 102, if a serviced connection is available, the method decrements the queue length for the serviced connection in step 110, and the connection is removed from the corresponding rate queue in step 112. The method then determines if the corresponding rate queue is empty in step 114. If the corresponding rate queue is empty, the method proceeds to step 116, as described below. Otherwise, if the rate queue is not empty in step 114, the method updates the rate queue timestamp in step 118, and updates the head pointer of the rate queue in step 120. The method then proceeds to step 116.

In step 116, the method determines if the queue length for the serviced connection is equal to zero. If so, the method performs step 122, as discussed below; otherwise, if the queue length is not equal to zero in step 116, the method proceeds to step 124 to identify the rate queue of the serviced connection. The method then determines in step 126 if the identified rate queue is empty. If not, the method links the connection to the tail of the rate queue in step 128, and sets the rate queue tail pointer to point to the serviced connection in step 130. Referring back to step 126, if the rate queue is empty, the method sets the timestamp of the rate queue in step 132, sets the head pointer of the rate queue to point to the serviced connection in step 134, and then proceeds to step 130 to set the rate queue tail pointer to point to the serviced connection. The system potential P( ) as used in equations (1) and (3) is then updated in step 136, and the method proceeds to step 104.

Referring back to step 116, after it is determined that the queue length for the serviced connection is zero, the method proceeds to step 122 to decrement the number of backlogged connections. The method then determines if there are any backlogged connections in step 138. If so, the method proceeds to step 136 and thence to step 104. Otherwise, if the method in step 138 determines that there are no backlogged connections, the method loops back to step 70 to process new data packets. Accordingly, the method shown in FIGS. 4A–4B implements the packet and connection processing for the scheduler 32 shown in FIGS. 2–3.

By the foregoing a novel and unobvious scheduler and method has been disclosed by way of the preferred embodiment. However, numerous modifications and substitutions may be had without departing from the spirit of the invention. For example, while the preferred embodiment discusses an ATM scheduler, it is wholly within the purview of the invention to contemplate applying the no-per-connection-timestamps processing in the manner as set forth above to other packet network systems. Accordingly, the invention has been described by way of illustration rather than limitation.

What is claimed is:

1. A method for servicing, at a predetermined service rate, a plurality of queues containing data packets, each of the queues being associated with respective connections, the connections traversing an associated communication switch, each of the connections being allocated a respective data transfer rate, the method comprising the steps of:

identifying for each received data packet, responsive to receiving a plurality of the data packets via a plurality of data links, the respective one of the connections and identifying the associated one of the queues;

storing each of the received data packets in one of the plurality of queues;

associating a queue of connections with each connection wherein an associated queue of each connection has at least one data packet waiting therein, in which the connection is identified as a backlogged connection, the queue of connections being associated with a respective data transfer rate equal to the data transfer rate associated with the backlogged connection;

appending a connection to the tail of the associated queue of connections when the connection becomes backlogged after a period of time during which no data packets are stored in its associated queue;

associating a timestamp with each of the queues of connections, including generating a new timestamp associated with a queue of connections each time a new backlogged connection reaches the head of the queue of connections, wherein a system potential is used in the generation of the new timestamp;

associating a cumulative service rate with each of the queues of connections, the cumulative service rate being used to generate the respective timestamp associated with each of the queues of connections;

generating a value for the system potential according to a predetermined function; and selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

2. The method of claim 1, wherein the selection of the timestamp identifying a backlogged connection as the recipient of a service is based on a Smallest-Finishing-potential-First (SFF) timestamp selection policy, wherein a timestamp is selected when its value is minimum among all timestamps associated with non-empty queues of connections.

3. The method of claim 1, wherein the selection of the timestamp identifying a backlogged connection as the recipient of a service is based on a Smallest-Eligible-Finishing-potential-First (SEFF) timestamp selection policy, wherein a timestamp is selected when its value is minimum among all timestamps being associated with non-empty queues of connections and not exceeding the system potential by more than a fixed amount, the amount being specific of each timestamp.

4. The method of claim 1, wherein the cumulative rate associated with each queue of connections is equal to the data transfer rate associated with the queue of connections multiplied by the number of allocated connections associated with the queue of connections.

5. The method of claim 1, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

6. The method of claim 4, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

7. A packet communication system for servicing, at a predetermined service rate, a plurality of queues containing data packets, each of the queues being associated with respective connections, the connections traversing an associated communication switch, each of the connections being allocated a respective data transfer rate, the packet communication system comprising:

a plurality of queues, with each queue for respectively storing received data packets;

a session controller which identifies for each received data packet, responsive to receiving a plurality of the data packets via a plurality of data links, the respective one of the connections and identifying the associated one of the queues;

wherein the session controller associates a queue of connections with each connection wherein an associated queue of each connection has at least one data packet waiting therein, in which the connection is identified as a backlogged connection, the queue of connections being associated with a respective data transfer rate equal to the data transfer rate associated with the backlogged connection;

wherein the session controller appends a connection to the tail of the associated queue of connections when the connection becomes backlogged after a period of time during which no data packets are stored in its associated queue;

wherein the session controller associates a timestamp with each of the queues of connections, including generating a new timestamp associated with a queue of connections each time a new backlogged connection reaches the head of the queue of connections, wherein a system potential is used in the generation of the new timestamp;

wherein the session controller associates a cumulative service rate with each of the queues of connections, the cumulative service rate being used to generate the respective timestamp associated with each of the queues of connections; and wherein the session controller generates a value for the system potential according to a predetermined function; and a selector for selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

8. The packet communication system of claim 7, wherein the selector performs the selection of the timestamp by identifying a backlogged connection as the recipient of a service is based on a Smallest-Finishing-potential-First (SFF) timestamp selection policy, wherein a timestamp is selected when its value is minimum among all timestamps associated with non-empty queues of connections.

9. The packet communication system of claim 7, wherein the selector performs the selection of the timestamp by identifying a backlogged connection as the recipient of a service is based on a SEFF timestamp selection policy, wherein a timestamp is selected when its value is minimum among all timestamps being associated with non-empty queues of connections and not exceeding the system potential by more than a fixed amount, the amount being specific of each timestamp.

10. The packet communication system of claim 7, wherein the cumulative rate associated with each queue of connections is equal to the data transfer rate associated with the queue of connections multiplied by the number of allocated connections associated with the queue of connections.

11. The packet communication system of claim 7, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

12. The packet communication system of claim 10, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

13. A packet communication system for servicing, at a predetermined service rate, a plurality of queues containing data packets, each of the queues being associated with respective connections, the connections traversing an associated communication switch, each of the connections being allocated a respective data transfer rate, the packet communication system comprising:

a memory having a plurality of queues, with each queue for respectively storing received data packets;

a session controller including:

means for identifying, for each received data packet, responsive to receiving a plurality of the data packets via a plurality of data links, the respective one of the connections and identifying the associated one of the queues;

means for associating a queue of connections with each connection wherein an associated queue of each connection has at least one data packet waiting therein, in which the connection is identified as a backlogged connection, the queue of connections being associated with a respective data transfer rate equal to the data transfer rate associated with the backlogged connection;

means for appending a connection to the tail of the associated queue of connections when the connection becomes backlogged after a period of time during which no data packets are stored in its associated queue;

means for associating a timestamp with each of the queues of connections, including generating a new timestamp associated with a queue of connections each time a new backlogged connection reaches the head of the queue of connections, wherein a system potential is used in the generation of the new timestamp;

means for associating a cumulative service rate with each of the queues of connections, the cumulative service rate being used to generate the respective timestamp associated with each of the queues of connections; and means for generating a value for the system potential according to a predetermined function; and selecting means for selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

14. The packet communication system of claim 13, wherein the selecting means performs the selection of the timestamp by identifying a backlogged connection as the recipient of a service is based on a Smallest-Finishing-potential-First (SFF) timestamp selection policy, wherein a timestamp is selected when its value is minimum among all timestamps associated with non-empty queues of connections.

15. The packet communication system of claim 13, wherein the selecting means performs the selection of the timestamp by identifying a backlogged connection as the recipient of a service is based on a Smallest-Eligible-Finishing-potential-First (SEFF) timestamp selection policy, wherein a timestamp is selected when its value is minimum among all timestamps being associated with non-empty queues of connections and not exceeding the system potential by more than a fixed amount, the amount being specific of each timestamp.

16. The packet communication system of claim 13, wherein the cumulative rate associated with each queue of connections is equal to the data transfer rate associated with the queue of connections multiplied by the number of allocated connections associated with the queue of connections.

17. The packet communication system of claim 13, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

18. The packet communication system of claim 16, wherein the timestamp associated with a queue of connections, generated each time a new backlogged connection reaches the head of the queue of connections, is generated as a maximum value between a previous value of the timestamp assigned to the queue of connections and a current value of the system potential, the maximum value incremented by the inverse of the cumulative data transfer rate associated with the queue of connections normalized to the rate of the server, if the queue of connections is empty before its head is reached by the new backlogged connection.

19. A method for processing connections in a packet-processing system, the method comprising the steps of:

queuing the connections into a plurality of queues of connections, with each queue having a single service rate associated with every connection in the respective queue;

allocating, for each queue, a single timestamp associated with every connection in the respective queue; and processing the connections using the timestamps of the queues by selecting a next connection for service from the plurality of queues of connections and from the single timestamps associated therewith using a smallest-eligible-virtual-finishing-time-first (SEFF) selector, where the SEFF selector is a packet-by-packet rate-proportional server (P-RPS).

20. The method of claim 19 wherein the SEFF is positioned at a root node of the packet-processing system connected to a plurality of heads, with each head being associated with a respective queue.

21. The method of claim 19 wherein the step of processing includes the step of:

processing each respective queue and connections therein as a respective macro-session.

22. The method of claim 21 wherein, for each macro-session, the respective queue includes a head having associated therewith the single timestamp of the sessions in the respective queue.

23. The method of claim 22 wherein the step of processing includes the steps of:

processing the sessions during a processing timeslot;

determining, for each queue, when a new session reaches the respective head of the respective queue of the respective macro-session; and generating a new timestamp for the macro-session.

24. The method of claim 23 wherein the step of generating a new timestamp includes the step of:

determining the new timestamp $F_l^k$ to be:

$$F_l^k = \max(F_l^{k-1}, P(h_l^k)) + \frac{1}{r_l}$$

in which P( ) is a global function representing a system potential, $h_l^k$ is the respective processing timeslot, and $r_1$ is a macro-session service rate associated with the macro-session.

25. A method for processing connections in a packet-processing system, the method comprising the steps of:

queuing the connections into a plurality of queues of connections, with each queue having a single service rate associated with each of the connections in the respective queue, with the connections having the same single service rate queues into a corresponding rate first-in-first-out (FIFO) queue to form the plurality queues, the single timestamp being associated with a head of the respective rate FIFO queue;

allocating, for each queue, a single timestamp to every connection in the respective queue; and processing the connections using a no-per-connection-timestamp scheduling procedure by selecting a next connection for service from the plurality of rate FIFO queues of connections and from the single timestamps associated with the heads of the plurality of rate FIFO queues using a smallest-eligible-virtual-finishing-time-first (SEFF) selector, wherein the SEFF selector is a packet-by-packet rate-proportional server (P-RPS).

26. The method of claim 25 wherein the SEFF selector is a P-RPS implementing a Minimum-Delay Self-Clocked Fair Queing (MD-SCFQ) scheduling procedure.

27. The method of claim 25 wherein the step of processing includes the step of:

processing each respective queue and connections therein as a respective macro-session;

determining, for each queue, when a new session reaches the respective head of the respective queue of the respective macro-session; and generating a new timestamp $F_l^k$ of the macro-session to be:

$$F_l^k = \max(F_l^k, P(h_l^k)) + 1/r_1$$

in which P( ) is a global function representing a system potential, $h_l^k$ is the respective processing timeslot, and $r_1$ is a macro-session service rate associated with the macro-session.

28. A scheduler for controlling processing connections associated with packets in a communication system, the scheduler comprising:

a plurality of queues of connections, with each queue having a single service rate associated with each of the connections in the respective queue;

a plurality of timestamps, with each respective timestamp being a single timestamp associated with a respective queue and the connections therein, wherein the connections in a respective queue are commonly associated with the respective timestamp of the queue; and a smallest-eligible-virtual-finishing-time-first (SEFF) selector, responsive to the plurality of timestamps, said SEFF selector being a packet-by-packet rate-proportional server (P-RPS) and used for processing the connections using a no-per-connection-timestamp scheduling procedure.

29. The scheduler of claim 28, further comprising:

a plurality of heads, with each head corresponding to a respective queue, wherein each timestamp is associated with a corresponding head.

30. The scheduler of claim 28, wherein the queues are rate first-in-first-out (FIFO) queues having the single service rate; and the SEFF selector selects a next connection for service from the plurality of rate FIFO queues of connections and from the single timestamps associated with heads of the plurality of rate FIFO queues using the no-per-connection-timestamp scheduling procedure.

31. The scheduler of claim 28, wherein the SEFF selector is a P-RPS implementing a Minimum-Delay Self-Clocked Fair Queuing (MD-SCFQ) scheduling procedure.

32. The scheduler of claim 28, wherein the connections are virtual connections associated with packets in an a synchronous transfer mode (ATM) communication system.

* * * * *